Oct. 25, 1966  R. J. CASSIDY  3,280,550
ELECTROTHERMAL MOTORS
Filed Sept. 1, 1964  3 Sheets-Sheet 1
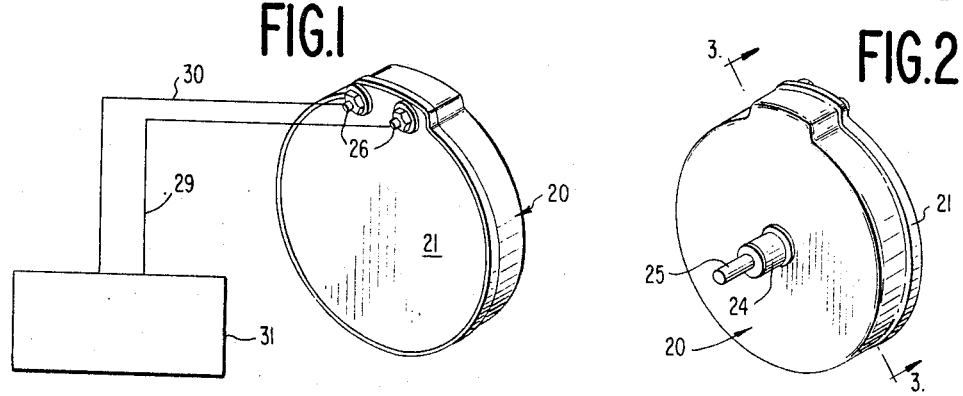
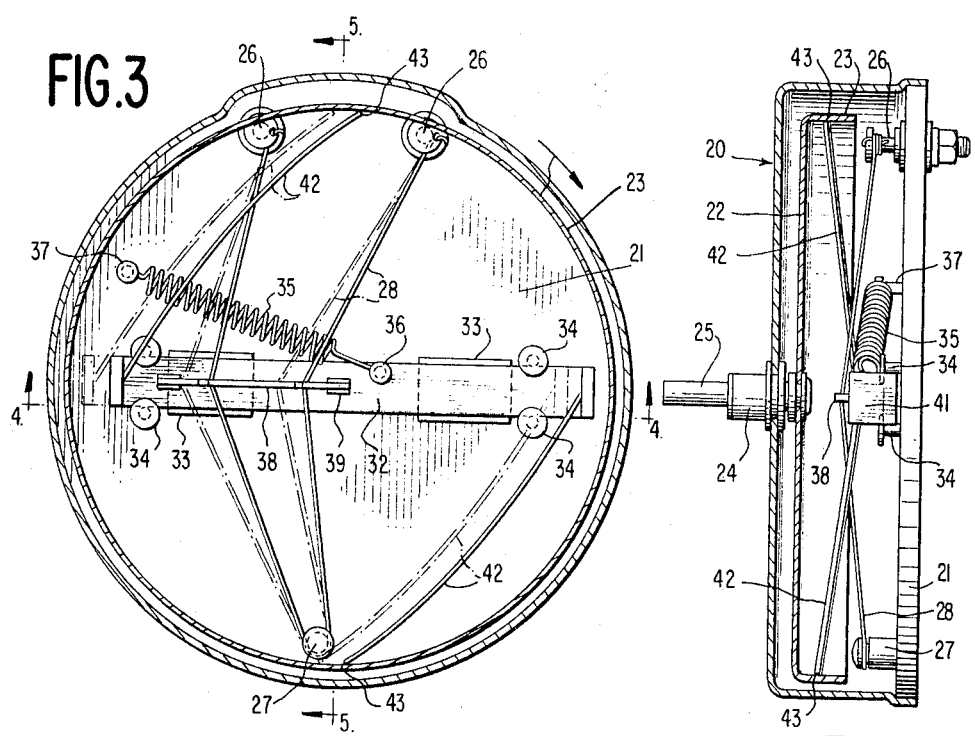
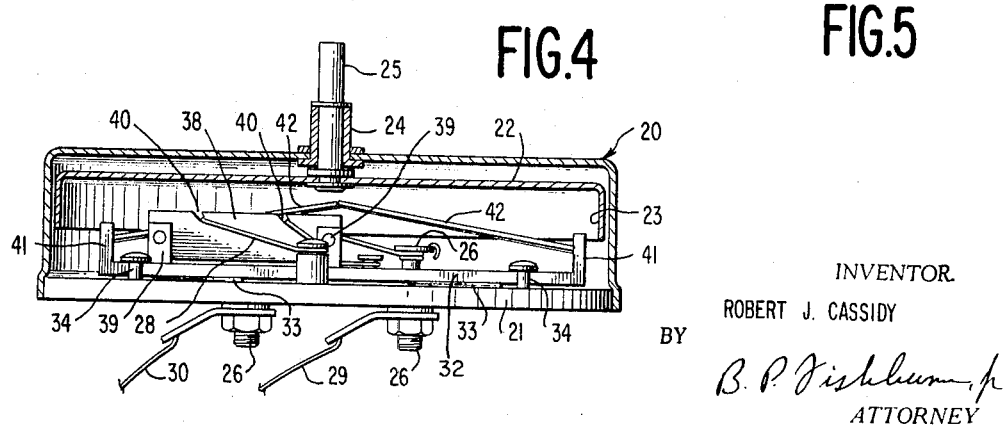
INVENTOR.
ROBERT J. CASSIDY
BY
B. P. Fishburn, Jr.
ATTORNEY Oct. 25, 1966 R. J. CASSIDY 3,280,550
ELECTROTHERMAL MOTORS
Filed Sept. 1, 1964 3 Sheets-Sheet 2
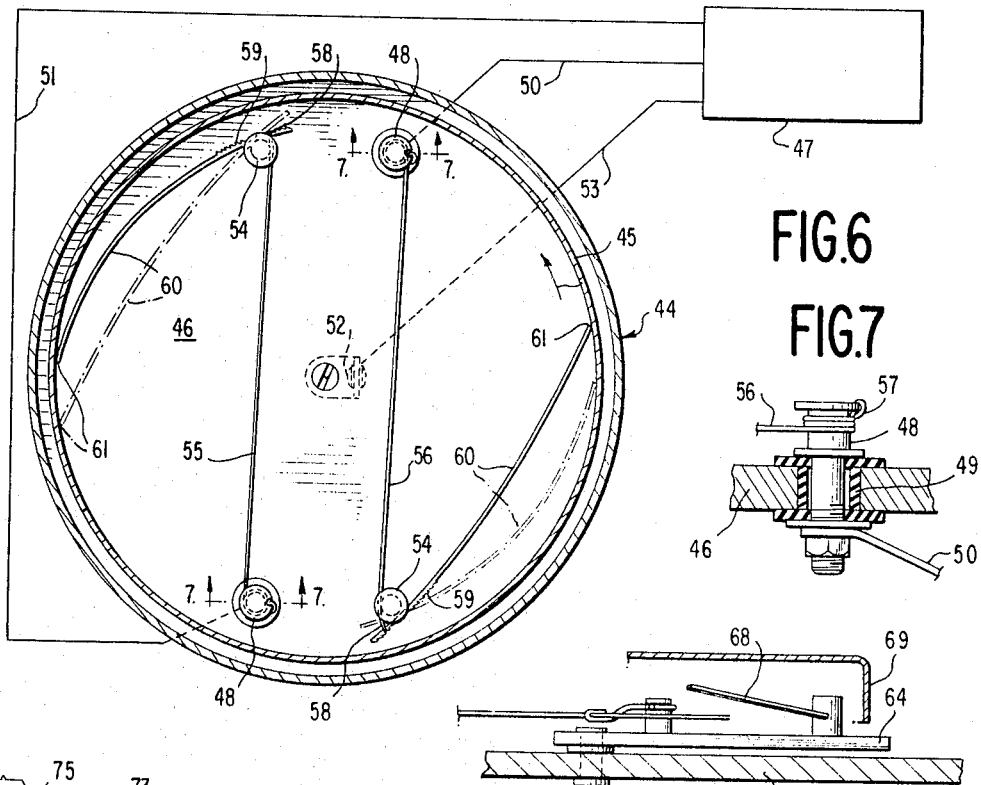
FIG.6
FIG.7
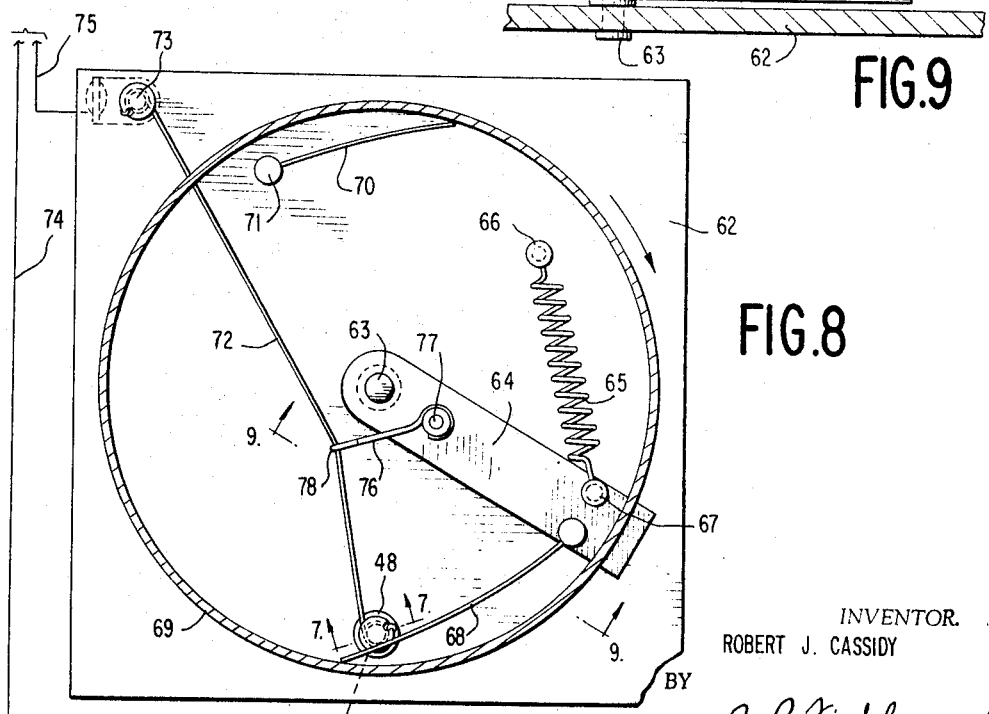
FIG.9
FIG.8
INVENTOR.
ROBERT J. CASSIDY
BY
B. P. Fishburn, Jr.
ATTORNEY Oct. 25, 1966  R. J. CASSIDY  3,280,550
ELECTROTHERMAL MOTORS
Filed Sept. 1, 1964  3 Sheets-Sheet 3
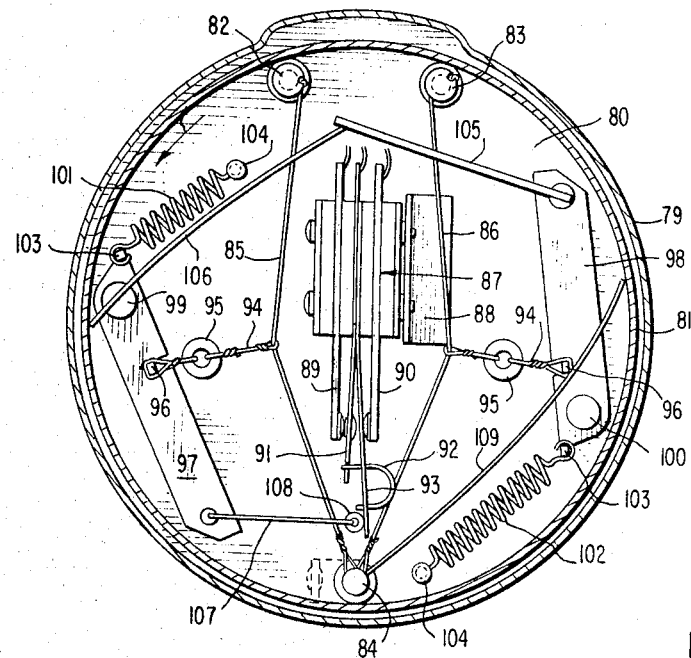
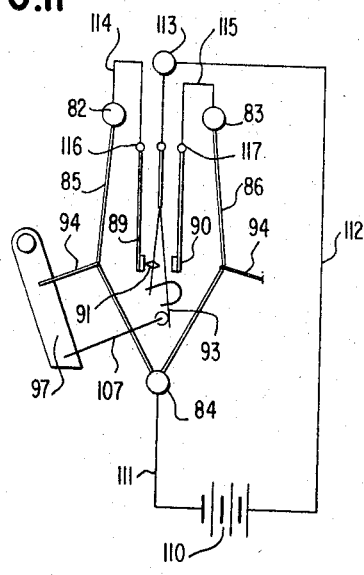
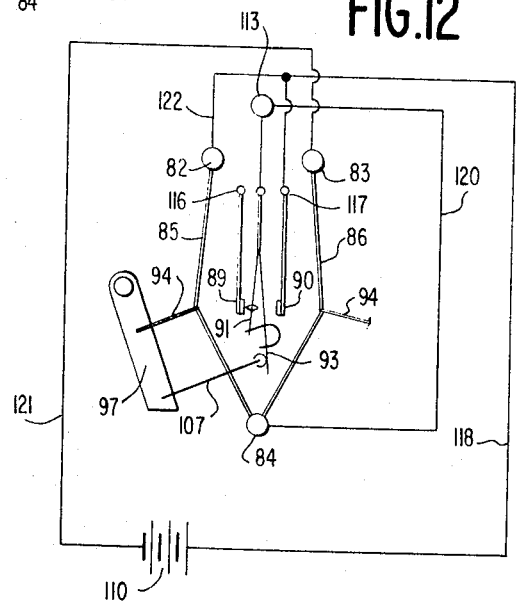
INVENTOR.
ROBERT J. CASSIDY
BY
B. P. Fishburn, Jr.
ATTORNEY

United States Patent Office 3,280,550
Patented Oct. 25, 1966

3,280,550
ELECTROTHERMAL MOTORS
Robert J. Cassidy, 7 Tranquil Ave., Greenville, S.C.
Filed Sept. 1, 1964, Ser. No. 393,681
17 Claims. (Cl. 60—23)

This invention relates to electrothermal motors commonly called hot wire motors.

More particularly, the invention is concerned with motors utilizing the contraction and expansion of a resistance wire upon the controlled cooling and heating thereof in conjunction with certain mechanical means to impart rotation to a body.

Hot wire motors of various types are know in the prior art and the main object of this invention is to improve upon the prior art by providing a motor which is highly simplified in construction and operation, free from complexities which have generally plagued the prior art and utilizing to the fullest the present-day excellent alloys which are available in the form of hot wires.

Some of the inherent advantages and features of the hot wire motors to be disclosed herein are the following:

(1) Very low speeds of rotation without gearing;
(2) High stall torque;
(3) Operates from low voltage sources and on either direct or alternating current;
(4) Inexpensive;
(5) Requires no lubrication;
(6) Operates in wide ambient temperature range or in vacuo;
(7) Quiet;
(8) Unharmed by continuous stall with excitation;
(9) Non-magnetic construction;
(10) Brushless, commutated by the power source;
(11) Very light weight yet rugged construction readily achieved.

Some contemplated applications or uses of the hot wire motors herein are the following:

(1) Small valve drivers;
(2) Power switching at low voltages and high currents;
(3) Low magnetic field service;
(4) Micromanipulators;
(5) Solar cell positioning;
(6) Noise free environments;
(7) Sensors with mechanical output;
(8) Self-balancing servos.

Other specific objects and advantages of the invention will become apparent to those skilled in the art during the course of the following detailed description.

In the accompanying drawings forming a part of this application and in which like numerals are employed to designate like parts throughout the same, FIGURE 1 is a perspective view of a hot wire motor according to one preferred embodiment thereof, FIGURE 2 is a further perspective view of the motor taken from the opposite end thereof, FIGURE 3 is an enlarged transverse cross sectional view taken on line 3—3 of FIGURE 2, FIGURE 4 is a horizontal cross section taken on line 4—4 of FIGURE 3, FIGURE 5 is a vertical cross section taken on line 5—5 of FIGURE 3, FIGURE 6 is a partly diagrammatic cross sectional view similar to FIGURE 3 showing a modified form of hot wire motor embodying the invention, FIGURE 7 is an enlarged fragmentary vertical cross section taken on line 7—7 of FIGURES 6 and 8, FIGURE 8 is a view similar to FIGURE 6 showing another modification of the invention.

FIGURE 9 is an enlarged fragmentary vertical section taken on line 9—9 of FIGURE 8.

FIGURE 10 is another enlarged view similar to FIGURE 3 showing a further modification of the invention, and FIGURES 11 and 12 are wiring diagrams showing two possible circuits for the motor illustrated in FIGURE 10.

In the drawings, wherein for the purpose of illustration are shown preferred embodiments of the invention, attention is directed first to FIGURES 1–5 inclusive showing a preferred form of hot wire motor, wherein the numeral 20 designates a preferably non-ferrous shallow thin walled casing having a substantially rigid cover plate 21 of aluminum or other lightweight material suitably anchored thereto removably, as shown. A lightweight rotor disc 22 having a shallow peripheral flange 23 is journaled for rotation inside of casing 20 on a central bearing 24 carried by the end wall of the casing. The rotor 23 has a suitable output shaft 25 extending outside of the bearing, as indicated.

As shown in the drawings, the hot wire element and associated mechanism is bodily mounted upon the plate 21 for convenience of assembly and servicing and for the sake of compactness. On this plate 21, FIGURE 3, is a pair of insulated metallic terminal posts 26 in relatively closely spaced relation at one circumferential portion of the plate 21 and near the periphery of the rotor. Substantially diametrically opposite the terminal posts 26 is an anchoring post 27 which may be insulated or grounded through the plate 21 and motor casing depending upon installation.

A continuous hot wire element 28 preferably formed of a stainless steel alloy known as Inconel-X manufactured by International Nickel Co., Inc., New York, New York or equivalent material is looped about the anchoring post 27 and has its ends securely anchored to the terminal posts 26 in any preferred manner. The hot wire 28 thus has a pair of sides, and it should be understood that a wire may be employed with multiple loops of any practical number for the purpose of increasing power, and the invention is not restricted to the use of a two-sided loop, as shown in FIGURE 3 for the purpose of simplified illustration. The looped or bifilar type hot wire element shown in FIGURE 3 for example, tends to produce electromagnetic field cancellation, and this makes the motor quite useful in critical applications where stray magnetic fields are undesirable.

As shown in FIGURE 1, the terminal posts 26 extend exteriorly of the motor casing for connection with wires 29 and 30 leading to and from a suitable A.C. or D.C. current pulse source 31 of a conventional type. A variety of pulsing devices may be employed to operate the hot wire motor and it is believed to be unnecessary to go into detail with this conventional aspect of the invention. The embodiment of the invention in FIGURES 1–5 utilizes an outside or remote pulse source for powering the motor. Other forms of the invention may employ a self-cycling arrangement or built-in pulsing device.

Extending transversely of the looped hot wire 28, substantially at the midpoints of its sides and diametrically of the rotor 23 is a slide bar 32 having sliding engagement with shallow bearing pads 33 on the mounting plate 21 to reduce friction during reciprocation lengthwise. Pairs of headed guide pins 34 are provided on opposite sides of and near the ends of the bar 32 to smoothly guide the same during reciprocation. A retractile coil spring 35 extends somewhat diagonally of the slide bar 32, FIGURE 3, and has one end anchored thereto at 36 near the longitudinal center of the slide bar, the remote end of the spring being anchored at 37 to the plate 21.

The spring therefore constantly biases the slide bar 32 in one direction, or to the left, as viewed in FIGURE 3.

An upstanding bridge member or strip 38 for the two sides of the hot wire 28 is rigidly mounted as at 39 on the slide plate 32 and the member 38 has a pair of spaced notches 40 formed in its upper edge as shown to receive the two sides or arms of the hot wire 28. The notches 40 are preferably inclined as shown in FIGURE 4 in the proper direction to make it substantially impossible for the hot wire to become accidentally dislodged therefrom while under tension, even in the present of vibration or under impact.

At least the regions of the strip 38 which engage the two sides of hot wire 28 must be formed of electrical insulating material, to prevent partial short circuiting of the hot wire by the strip 38. If the entire motor is insulated from the ground post 27 may be metal. If the motor casing is not insulated from the ground, the post 27 is non-conductive so that current from the pulse source 31 may flow to one of the insulated terminal posts 26 and through the hot wire 28 and then back to the pulse source without short circuiting. The strip 38 maintains the two sides of the hot wire 28 taut and somewhat elevated so as to clear the spring 35, etc. during operation. However, the entire structure mounted on the flat plate 21 is very low and compact and operates substantially in one plane, as will be explained, and this is one of the chief virtues of the construction.

The slide bar 32 has short upturned ends 41 integral therewith, each having fixedly secured thereto in any suitable manner a spring driving element or lever 42, both such levers extending generally diagonally from the ends of the bar 32 in opposite directions and in substantial parallelism. The spring levers 42 slope upwardly somewhat toward their driving tips 43, which tips, FIGURES 3 and 5, positively engage the peripheral wall 23 of the rotor to drive the same frictionally. The levers 42 are highly resilient, slender spring steel elements and they are relatively hard. Their driving tips 43 may be pointed if desired. In any event, the driving tips 43 tend to have a "biting" or digging action into the peripheral wall 23 which is formed of relatively softer material. Inside of the rotor 22, the driving levers 42 are somewhat bowed and under some tension at all times to keep their driving tips in contact with the rotor wall 23. The driving tips engage the wall 23 at substantially diametrically opposite points on the rotor and each lever 42 is set at an acuate angle to the rotor wall 23 for positive driving action and for easy retrograde movement upon this wall without dragging.

The operation of the motor shown in FIGURES 1–5 is as follows.

Current of suitable magnitude and low voltage from the pulse source 31 passes therefrom through one of the wires 29 or 30 to one of the posts 26 and then through the hot wire 28 to the other post 26 and back to the pulse source 31 completing a circuit. As is well known, the hot wire 28 is a resistance element having notable thermal expansion and contraction characteristics. No technical discussion of hot wires per se is necessary or desirable to a proper understanding of this invention, only to point out that the best possible hot wire material will naturally result in a more efficient motor. Whenever the hot wire 28 is cool due to interruption in the flow of current therethrough, both sides of the looped hot wire quickly contract and cause shifting of the slide plate 32 and associated parts to the right or to the full line position shown in FIGURE 3 and the spring 35 resists this movement but its force is overcome by the contracting hot wire. During such movement caused by contraction of the hot wire, the uppermost spring lever 42 in FIGURE 3 positively engages and drives the rotor 22 a step in the clockwise direction as shown by the arrow, and during such movement the lower lever 42 slides freely over the inner face of the wall 23. On the next current cycle through the hot wire, the same is quickly heated and expands and has its length increased materially. The spring 35 instantly pulls slide bar 32 in the reverse direction to the dotted line position in FIGURE 3 and the increased length of the hot wire allows and limits the extent of this movement. During this movement, the lower spring lever 42 engages and drives the rotor another step in the direction of the arrow while the upper spring lever merely slides rearwardly relative to the rotor. Continued operation of the device in the same manner causes continuous reciprocation of the bar 32 and alternate effective driving engagement of the spring levers 42 and the rapidity of the operation can be such that the rotor 22 will turn substantially continuously at a very slow speed of rotation such as one revolution per minute. The ouput shaft 25 will deliver several inch ounces of torque at these slow speeds. The torque capabilities and speed of the motor are somewhat variable depending upon size and other design characteristics.

The present invention greatly simplifies hot wire motor construction and results in improved performance characteristics in comparison to the prior art. The motor in FIGURES 1–5 is self-braking in the reverse direction because the spring tensioned levers 42 have their driving tips 43 arranged to automatically resist reverse movement of the rotor 22 by digging into the peripheral wall 23. This is obvious from an inspection of FIGURE 3.

FIGURES 6–7 show a modified form of hot wire motor having generally the physical construction and operational capabilities of the prior embodiment but differing therefrom in the following respects.

With reference to FIGURE 6, the casing corresponding to the previous-described casing 20 and constructed in substantially the same manner is indicated at 44. The internal rotor corresponding to the previous rotor 22 is shown by the numeral 45. The cover or mounting plate for the casing which supports the working mechanism and corresponding to the plate 21 is indicated at 46. The external pulse source is shown at 47 in FIGURE 6.

Upon the plate 46 at diametrically opposite points and inwardly of the rotor peripheral wall 45 are a pair of terminal posts 48 electrically insulated from the plate 46 in the manner shown at 49, FIGURE 7. Externally of the casing 44, these terminal posts 48 are electrically connected with wires 50 and 51, leading to and from the pulse source 47. There is a grounding connection at 52, FIGURE 6, on the motor casing 44, electrically connected with another wire 53 back to the pulse source 47.

On the plate 46 and spaced somewhat circumferentially from posts 48 are grounded or non-insulated anchor posts or pins 54 and these two pins are also diametrically opposed, as shown. Two separate hot wire elements 55 and 56 are employed, having corresponding ends looped about and firmly anchored to the terminal posts 48, as clearly shown at 57 in FIGURE 7. The other corresponding ends of the hot wires 55 and 56 have small loops 58 provided thereon for selective engagement with any one of a number of small teeth 59 formed on the rear end portions of spring driving levers 60. The spring levers 60 have driving tips 61 which engage the rotor 45 at diametrically opposite points and these levers are generally parallel and extend diagonally in opposite directions as shown for driving the rotor in the direction of the arrow, as will be further described. As shown in FIGURE 6, the rear toothed end portions of the levers 60 and the adjacent end portions of the hot wires engage the anchoring pins 54 substantially on opposite sides of the same. The terminals 48, FIGURE 7, constitute capstans and therefore a ready means of adjusting the tension of the hot wires. The teeth 59 and loops 58 aid in adjusting the degree of tension on each spring lever 60 independently. The levers 60 are preferably somewhat bowed and under some tension at all times.

The preferred mode of operation of the motor embodiment in FIGURES 6 and 7 is the following.

The pulse source 47 operates so that the two hot wires 55 and 56 will expand and contract alternately or out of phase. That is to say, when the wire 55 is cold and contracting, the wire 56 will be hot and expanding. When the wires 55 and 56 are cold and contracting, the strong pulling forces exerted thereby are transmitted around the posts 54 and upon the spring levers 60 to bow the same and store driving energy therein, as shown by the solid lines in FIGURE 6. When the hot wires 55 and 56 expand due to heating from the next pulse of current therethrough, their lengths increase and this permits the release of the energy stored in the spring levers 60 so that they may move from their solid line position to their broken line position to move the rotor 45 step-by-step and substantially continuously in the direction of the arrow.

By having the two hot wires alternately cycled as above-mentioned, one spring lever 60 will always be driving the rotor 45 while the other spring lever is being retracted and having energy stored therein for the next driving impulse on the rotor. Due to the fact that the levers 60 engage the rotor side wall at an acute angle, there is very little drag on the rotor by reverse relative movements of the levers to store energy therein. As in the prior form of the invention, the motor has inherently a high resistance to turning in the reverse direction, and as in the prior form of the invention, driving of the rotor occurs on both the heating and cooling cycles, with reference to both hot wires working alternately. Considering only one of the hot wires in FIGURE 6, the rotor driving stroke occurs only when the wire is heated to allow release of the energy in the associated lever 60. The FIGURE 6 motor differs from the first embodiment in that each hot wire functions somewhat indirectly by storing driving energy in the levers 60, whereas in the prior embodiment the change in length of the hot wire causes direct actuation of the rotor.

The motor illustrated in FIGURES 6 and 7 enjoys the same features of compactness and simplicity, generally speaking, as the motor previously described, and this applies to all forms of the invention.

FIGURES 8 and 9 show another modification of the hot wire motor embodying the same basic advantages previously indicated but differing from the two prior embodiments in that it employs only a single hot wire filament or strand and a single spring driving lever and associated mechanism. With reference to FIGURES 8 and 9, a support plate or stator is indicated at 62 having pivoted thereto centrally as at 63, close to one side thereof, a single radial arm 64, biased to swing in one direction circumferentially by a retractile coil spring 65, having one end anchored to the stator plate 62 at 66 and its opposite end anchored to the arm 64 near the outer end thereof as shown at 67. The arm 64 near its outer end carries a single spring driving lever 68 generally similar to the previously-described driving levers and engaging the peripheral side wall 69 of the rotor at an acute angle for driving the rotor in the direction of the arrow step-by-step. A fixed holding spring lever 70 is provided substantially diametrically opposite the lever 68 to prevent reverse movement of the rotor 69 when the driving lever is being retracted by the spring 65. The holding lever 70 is anchored to plate 62 at 71.

A hot wire element 72 extends generally transversely of the rotational axis of the motor and has one end thereof secured to a terminal post 48 which may be the identical terminal post 48 previously described. The other end of the hot wire is secured to an anchoring post 73 on the plate 62. The post 48 is also mounted upon the plate 62, which plate supports all of the working parts.

A suitable external pulse source, not shown, is connected by wires 74 and 75 with the hot wire through the posts 48 and 73. The latter post 73 may be grounded through the plate 62 or may in some installations be an insulated post.

A short tension link 76 interconnects the arm 64 at a point 77 spaced somewhat from the pivot 63 and the hot wire 72 at a point 78 intermediate its ends.

The mode of operation is as follows:

Upon each current pulse to the hot wire 72, it expands and lengthens and allows the spring 65 to take up the slack in the hot wire and to drag the driving spring lever 68 in a reverse direction or counterclockwise in FIGURE 8. At this time, the holding lever 70 prevents counterclockwise movement of the rotor 69. When the pulsing means next interrupts the current to the hot wire 72, the same cools and contracts and tends to become straight between the posts 48 and 73, and through the link 76, the arm 64 is swung clockwise against the force of spring 65 and the driving lever 68 causes the rotation of the rotor 69 for a step in the direction of the arrow. The driving step thus occurs only upon each cooling of the hot wire and contracting thereof.

FIGURE 10 of the drawings shows a further modification of the invention, wherein the motor has a built-in cycling or pulsing device or chopper as distinguished from an external pulsing means or a remote means common to the previously-described embodiments. FIGURES 11 and 12 show alternative circuit arrangements for the motor illustrated in FIGURE 10.

With reference to these figures, the motor casing or stator 79 is constructed substantially as in the prior forms of the invention and includes an end plate 80 corresponding to the plates 21, 46, etc. upon which the working components are mounted. The peripheral wall portion of the rotor is indicated at 81.

A pair of terminal posts 82 and 83 are secured to the plate 80 in spaced relation just inwardly of the rotor 81, and substantially diametrically opposite these posts and between the same, a third anchoring post 84 is rigidly secured to the mountnig plate 80. All of the posts 82, 83 and 84 may be constructed and insulated from the mounting plate 80 in the typical manner shown in FIGURE 7 of the drawings to permit wiring of the motor in either of the two arrangements shown in FIGURES 11 and 12, presently to be described.

Hot wire elements 85 and 86 have adjacent ends connected with the anchoring post 84, as shown, and have their opposite ends connected with the terminal posts 82 and 83. These hot wires may lie very close to the mounting plate 80 so as to provide a most compact assembly. Intermediate the two hot wires 85 and 86 a suitable current chopping device or switch assembly 87 is secured to the mounting plate 80 through a rigid bracket means 88. The switch embodies opposed stationary contact arms 89 and 90 and an intermediate arm 91 actuated by an overcenter spring 92 connected with an operating leaf 93. Other conventional forms of switches or chopper devices may be employed.

Near their midpoints, FIGURE 10, the hot wires 85 and 86 are engaged and stretched laterally apart by transversely extending pull wires 94 having insulator rings 95 connected therein. These pull wires have their outer ends connected at 96 to pivoted arms 97 and 98 which lie close to the mounting plate 80 and swing in a plane parallel thereto on pivot pins 99 and 100 near opposite corresponding ends of the arms. The arms 97 and 98 are in generally parallel relation just inwardly of the rotor side wall 81. The arms have their free or non-pivoted ends biased outwardly generally radially by contractile coil springs 101 and 102, whose ends are secured to the arms at 103, close to the pivots 99 and 100 and to the mounting plate 80, as at 104, at substantially diametrically opposite points. It may be seen in FIGURE 10 that the springs 101 and 102 serve to stretch or bias the hot wires 85 and 86 laterally apart.

The non-pivoted end of arm 98 carries a rigid generally transverse extension 105, projecting across the rear of the switch 87 and carried by the end of this extension is one of the typical spring driving levers 106 which engages the rotor wall 81 at an acute angle to drive the same step-by-step in the direction of the arrow. The corresponding end of the pivoted arm 97 carries a generally transverse switch-actuator extension 107 having an insulator 108 on its tip to engage and operate the extension 93 and intermediate movable switch arm 91.

A spring lever 109 is fixedly secured to the post 84 above the hot wires and engages the rotor 81 at an acute angle substantially diametrically opposite the lever 106 and in the opposite direction to prevent reverse rotation of the rotor as when the spring lever 106 is retracted by spring 102.

The motor shown in FIGURE 10 chops the input current and therefore requires no external or remote pulse source and this is advantageous to certain applications of the motor. In all other respects, its principle of operation is the same as in the prior embodiments.

The motor may be wired in parallel or in series as shown in FIGURES 11 and 12 respectively. In FIGURE 11, a source of current 110 has one terminal thereof connected by a wire 111 with the post 84 and the other terminal thereof connected by a wire 112 with intermediate terminal 113 of intermediate switch arm or contact 91. Additional wires 114 and 115 interconnect the terminals 116 and 117 of the outer switch arms 89 and 90 with the terminal posts 82 and 83 respectively of the two hot wires 85 and 86.

During operation, with the wiring arrangement in FIGURE 11, the resistance values of the switch driving hot wire 85 and the motor driving hot wire 86 may be any values because the current passes through only one of these resistances at one time. Current from the source 110 through the wire 112 and switch contacts 91 and 89 and wire 114 and through the hot wire 85 causes the latter to be heated and expanded, and this allows spring 101 to overcome the pull exerted through the pull wire 94 and swing the actuator 107 away from the extension 93, separating switching contacts 89 and 91. Contact 91 now engages contact 90 and current no longer flows through switch driving hot wire 85 but does flow through the motor driving hot wire 86. Current flows from the source 110 through the wire 112, contacts 91 and 90 and wire 115 to the hot wire 86. When the hot wire 86 is thus heated and relaxes, the spring 102 can retract the driving lever 106 by swinging the arm 98 clockwise in FIGURE 10. When the switch driving hot wire 85 cools and contracts and overcomes the spring 101, the switch is again actuated to interrupt the current through hot wire 86 and re-establish current flow through hot wire 85. When the hot wire 86 thus cools and contracts, it overcomes spring 102 and through the pull wire 94 swings arm 98 in the direction for driving rotor 81 in the direction of the arrow. The rotor 81 merely slides over the reverse holding lever 109 at this time. When the driving lever 106 is retracted on the next heating cycle of hot wire 86, under influence of spring 102, the element 109 prevents reverse movement of the rotor.

It should now be apparent without the need for any further description that the motor furnishes it own pulses and drives or revolves the rotor 81 in a step-by-step manner which can approach continuous rotation. The wires 85 and 86 are alternately heated and cooled in the manner described and coact with the springs 101 and 102 and the pivoted arms 97 and 98 to cycle the switch or chopper and also to drive the rotor.

FIGURE 12 shows a series wiring arrangement for the motor, and when this is employed, the switch becomes a single pole single throw switch because the contact 89 is not in the circuit. In the FIGURE 12 arrangement, the resistance value of switch driving hot wire 85 is much greater than the resistance value of motor driving hot wire 86. With the two hot wires 85 and 86 in series as shown in FIGURE 12 and the switch open across the contacts 90 and 91, the following takes place. Current from the source 110 flows through wire 118 and wire 122 and then through the two hot wires 85 and 86 in series and back through wire 121 to complete the circuit. When the switch contacts 90–91 close in FIGURE 12 due to heating and expansion of the hot wire 85, current flows from the source 110 through wire 118 and through the closed switch to wire 120 and then through motor driving hot wire 86 and wire 121 to complete the circuit. The switch driving hot wire 85 is then shorted out from the circuit and cold and will contract to draw the element 107 inwardly to cause reopening of the switch. When this occurs, current will again flow through both hots wires 85 and 86 in series as illustrated in FIGURE 12.

With the two hot wires 85 and 86 thus arranged for series operation, current in the system is of two values, a low current (passing through both resistances 85 and 86) which primarily produces the closing action of switch 90–91, and a higher current value through the motor driving hot wire 86 only when the switch driving hot wire 85 is shorted out by the switch in FIGURE 12. When cooling of the hot wire 85 takes place with corresponding contraction thereof, the switch is caused to open, as stated.

With either parallel or series wiring, FIGURES 11 and 12, the net mechanical operation of the motor, FIGURE 10, is the same. It is thought that no further description of the hot wire motor structure in FIGURE 10 or its mode of operation is necessary herein, and that the invention in its several embodiments should now be clear to those skilled in the art.

It is to be understood that the forms of the invention herewith shown and described are to be taken as preferred examples of the same, and that various changes in the shape, size and arrangement of parts may be resorted to, without departing from the spirit of the invention or scope of the subjoined claims.

Having thus described my invention, I claim:

1. An electrothermal motor comprising a stator structure, a rotor structure journaled for rotation upon the stator structure and including an annular side wall, a thermally expansible and contractible resistance wire element mounted upon the stator structure, means to supply current pulses to said wire element to alternately heat and cool the same, and mechanical means on the stator structure and connected with said wire element and moved by the cyclic expansion and contraction of the wire element and including a resilient lever directly frictionally engaging the annular side wall at an acute angle thereto to advance the side wall in a step-by-step manner in one direction.

2. The invention as defined by claim 1, and means to resist reverse rotation of the rotor structure while said resilient lever is inactive.

3. A hot wire motor for deriving rotary motion from the expansion and contraction of a hot wire resistance element comprising a shallow motor casing constituting a stator, a cover plate for one open end of the casing, a shallow cup-like rotor within the casing having its open side facing the cover plate and spaced a slight distance only therefrom, an output shaft carrying the rotor and journaled on the casing and extending exteriorly thereof, hot wire means bodily mounted upon the cover plate and having electrical terminals through which current pulses are supplied to the hot wire means, mechanical linkage means movably mounted upon said cover plate in opposed relation to said rotor and including at least one spring driving lever projecting away from the cover plate and into the cup-like rotor and frictionally engaging the interior face of the side wall thereof to turn the rotor upon the cyclic expansion and contraction of the hot wire means caused by heating and cooling thereof.

4. A hot wire actuated rotational motor comprising a stator body portion including an end mounting plate, a rotor journaled on the stator body portion in opposed relation to the end mounting plate and having an axial peripheral wall, a slide member on the end mounting plate and having guided enagement therewith and adapted to reciprocate substantially diametrically of the motor, a hot wire element having ends anchored to the end mounting plate and spanning the plate generally transversely of the slide member in crossing relation thereto and connected with the slide member, resilient means interconnecting the slide member and stator body portion and urging the slide member in one longitudinal direction and opposite to the direction in which the hot wire element tends to move the slide member upon cooling and contracting, electrical terminal means connected with the hot wire element and extending externally of the stator body portion for connection with an external pulsing source, and a pair of spring levers secured to said member near the opposite ends thereof and projecting diagonally from opposite sides of the member and having driving tips which engage said peripheral wall frictionally and at acute angles thereto at substantially opposed diametrical points thereon to impart rotation to the rotor during said reciprocation of said member.

5. A self-cycling rotational hot wire motor comprising a stator part, a rotor part to turn relative to the stator part and substantially coaxial therewith, first and second hot wire elements on the stator part, means connected with the stator part to supply current thereto, a chopper device on the stator part, resilient means on the stator part connected with the first hot wire element and resisting contraction thereof and including a mechanical operating element for said chopper device, additional resilient means on the stator part and connected with the second hot wire element and resisting contraction thereof and including a driving part having frictional contact with the rotor part to turn the same, and means engaging the rotor part to resist retrograde movement thereof.

6. The invention as defined by claim 5, and wherein the first and second hot wire elements are electrically connected in parallel, and said chopper device is a single pole double throw switch actuatable by the first-named resilient means to cause current to flow through one or the other of said hot wire elements cyclically and alternately.

7. The invention as defined by claim 5, and wherein the first and second hot wire elements are series connected electrically and said chopper device is a single pole single throw switch actuatable by the first-named resilient means to cause current to pass cyclically and alternately first through both hot wire elements in series and then through the second hot wire element only connected with said additional resilient means.

8. A rotational hot wire motor comprising a stator and a rotor to turn relative to the stator, a hot wire element on the stator and having an electrical connection on the stator to receive a current pulse for alternately heating and cooling the hot wire, a resilient driving lever connected directly to the hot wire element and having a driving tip frictionally engaging said rotor to turn the same, contracting of the hot wire element responsive to cooling causing bending of the driving lever and the storage of energy therein and subsequent expanding of the hot wire element responsive to heating allowing straightening of the driving lever and release of the energy therein to drive said rotor in one direction, and means to resist reverse rotation of the rotor.

9. The invention as defined by claim 8, and a second hot wire element and resilient driving lever on the stator to be operated cyclically and alternately with the first-named hot wire element and lever and wherein the two levers frictionally engage the rotor at substantially diametrically opposite points and in opposite directions and at acute angles to the peripheral wall of the rotor.

10. A hot wire motor comprising a stator, a rotor to turn relative to the stator, first and second hot wire elements on the stator in generally parallel relation and generally diametrically thereof, terminal means connected with said elements to allow feeding of current pulses thereto alternately from a remote source, anchor elements on the stator at diametrically opposed points thereon and engaging corresponding end portions of the hot wire elements, and resilient driving levers connected adjustably with the last-mentioned ends of the hot wire elements and engaging said anchor elements and having substantially oppositely directed driving tips which engage the rotor frictionally to impart rotation thereto responsive to alternate heating and cooling of the first and second hot wire elements, cooling of the hot wire elements causing bowing of said driving levers and the storage of energy therein and subsequent heating of the hot wire elements allowing the release of said energy.

11. The invention as defined by claim 10, and wherein adjustable connections between said levers and hot wire elements comprise loops on the ends of said elements and teeth on corresponding end portions of the levers selectively engageable with said loops.

12. A hot wire rotary motor comprising a relatively stationary part and a rotor part, a hot wire mounted upon the stationary part and having electrical terminals adapted to receive current pulses, an arm pivoted to the stationary part near the hot wire on a pivot axis which is substantially coaxial with the rotational axis of the rotor part, said arm extending radially of the rotor part, a resilient elongated driving lever on said arm having a driving tip engaging the rotor part at an acute angle thereto and bodily movable with the arm, a spring connected with the arm and stationary part and biasing the arm in one direction of swing on its pivot, and a link interconnecting the arm with said hot wire intermediate the ends of the arm and hot wire, whereby the hot wire upon cooling may resist and overcome the force of said spring and move said arm to turn said rotor part in one direction, and means to resist turning of the rotor part in a reverse direction.

13. A rotational hot wire motor comprising a stator, a rotor journaled upon the stator and having an annular part to be engaged frictionally for driving the rotor, a reciprocatory slide on the stator substantially diametrically thereof, a spring interconnecting the slide and stator and biasing the slide in one direction upon the stator, oppositely diagonally extending resilient friction driving elements carried by the slide near opposite ends thereof and engaging said annular part of the rotor and turning the rotor in one direction during reciprocation of the slide, and a hot wire on the stator spanning the same generally transversely of the slide and intersecting and crossing the slide and connected intermediate the ends of the hot wire and slide with said slide, whereby contractions of the hot wire shift the slide in one direction against the force of said spring and expansions of the hot wire allow the spring to shift the slide in the opposite direction, the hot wire including terminals on said stator.

14. The invention as defined by claim 13, and wherein said hot wire spanning said stator is in loop form having at least a pair of spaced sides, and a bridge element on said slide having notches engaging said sides of the hot wire and holding them somewhat elevated from the slide.

15. The invention as defined by claim 11, and wherein said terminal means connected with the hot wire elements constitute posts on the stator which may be rotated and secured in the selected adjusted position for regulating the tension of the hot wire elements.

16. The invention as defined by claim 13, and wherein said terminals are a pair of spaced posts on the stator near one side thereof, an anchoring post on the stator near the opposite side thereof, said terminal and anchoring posts on opposite sides of the slide, and said hot wire constituting a two-sided loop engaging about the anchoring post with ends connected to the terminal posts and the spaced sides of the loop crossing the slide and secured thereto intermediate the ends of the slide and loop.

17. An electrothermal motor comprising a stator structure, a rotor structure journaled for rotation upon the stator structure and including a peripheral wall, a thermally expansible and contractible resistance wire element mounted upon said stator structure, means to supply current pulses to said wire element to alternately heat and cool the same, and a resilient driving lever connected with said wire element on the stator structure and moved by the cyclic expansion and contraction of said wire element, said lever having its forward tip directly frictionally engaging the inner face of said peripheral wall to advance said wall and rotor structure in a step-by-step manner in one direction.

References Cited by the Examiner

UNITED STATES PATENTS

| | | |
|---|---|---|
| 1,804,709 | 5/1931 | Shoenberg _____ 310—4.1 |
| 2,203,719 | 6/1940 | Crane. |
| 2,722,613 | 11/1955 | Culbertson et al. _____ 60—23 X |
| 2,729,756 | 1/1956 | Euler et al. _____ 60—23 X |
| 3,142,149 | 7/1964 | Hays _____ 60—23 |

EDGAR W. GEOGHEGAN, *Primary Examiner.*